United States Patent [19]
Williams et al.

[11] Patent Number: 5,247,600
[45] Date of Patent: Sep. 21, 1993

[54] FIBER OPTIC DATA/GRAPHIC DISPLAY SCREEN

[76] Inventors: Charles M. Williams, 3246 36th Ave., SW., Seattle, Wash. 98126; Richard Harrington, 4507 W. 16th Ave., Vancouver, B.C., Canada, V6R 3E8

[21] Appl. No.: 793,250

[22] Filed: Nov. 12, 1991

Related U.S. Application Data

[63] Continuation-in-part of Ser. No. 460,650, Jan. 3, 1990, abandoned.

[51] Int. Cl.$^5$ .............................................. G02B 6/04
[52] U.S. Cl. .................................. 385/115; 385/120; 385/147; 385/901; 40/547
[58] Field of Search ............... 385/115, 147, 120, 116, 385/901; 40/547

[56] References Cited

U.S. PATENT DOCUMENTS

| | | | |
|---|---|---|---|
| 5,033,814 | 7/1991 | Brown et al. | 385/116 X |
| 5,101,466 | 3/1992 | Reidinger | 385/147 |
| 5,109,459 | 4/1992 | Eibert et al. | 385/115 |
| 5,121,030 | 6/1992 | Schott | 385/115 X |

Primary Examiner—John D. Lee
Assistant Examiner—Phan T. Heartney
Attorney, Agent, or Firm—Frank D. Gilliam

[57] ABSTRACT

A fiber optic display screen for use in high ambient light environments. A source of high intensity light is provided the output of which is controlled by a light gate control. The light gate control comprises a plurality of individual light shutters which pass or obstruct light from the high intensity light. Each of the plurality of light shutters includes an optic fiber which extends from the shutter output to an area remote therefrom where the distal ends of the fibers are terminated along the same vertical plane with each of the optic fibers positioned in the same relative location as the shutter end. Light passing through individual shutters of the plurality of shutters is displayed at the same location at the distal ends thereof. By selectively operating specific shutters to allow light from the high intensity light to pass through the optic fibers intelligent information can be formed at the distal ends of the plurality of optic fibers. This information can be readily seen under high ambient light conditions.

5 Claims, 2 Drawing Sheets

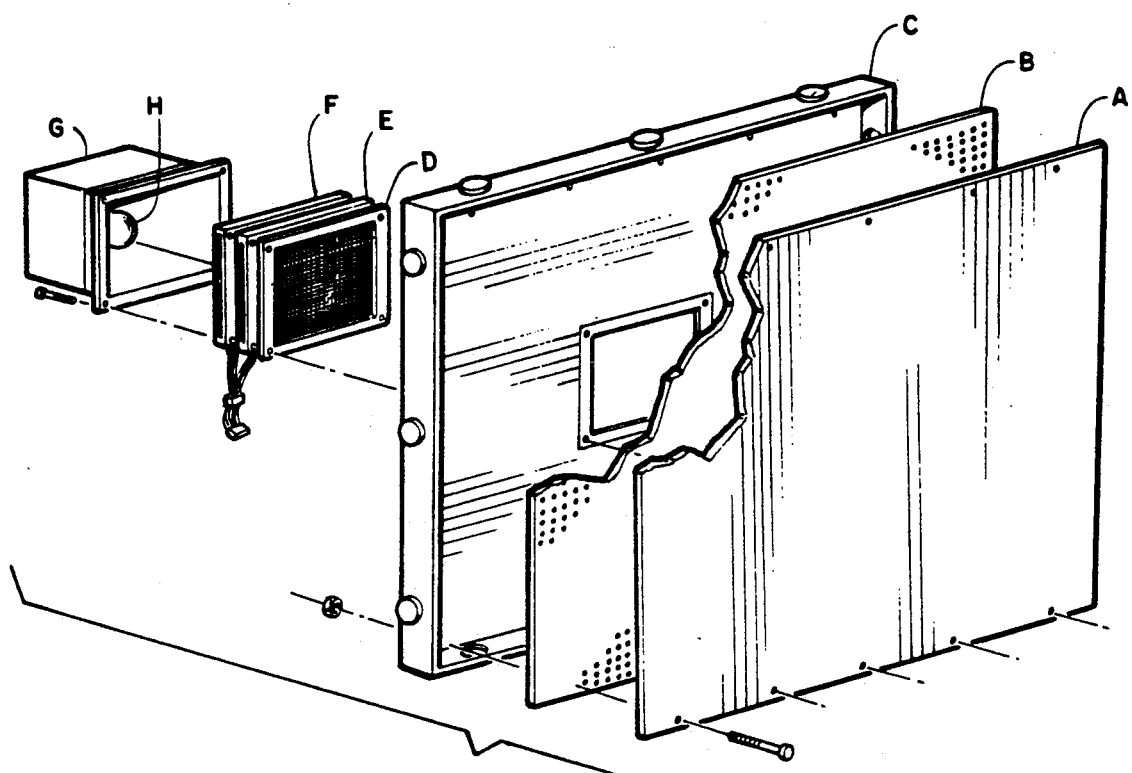
FIGURE 1
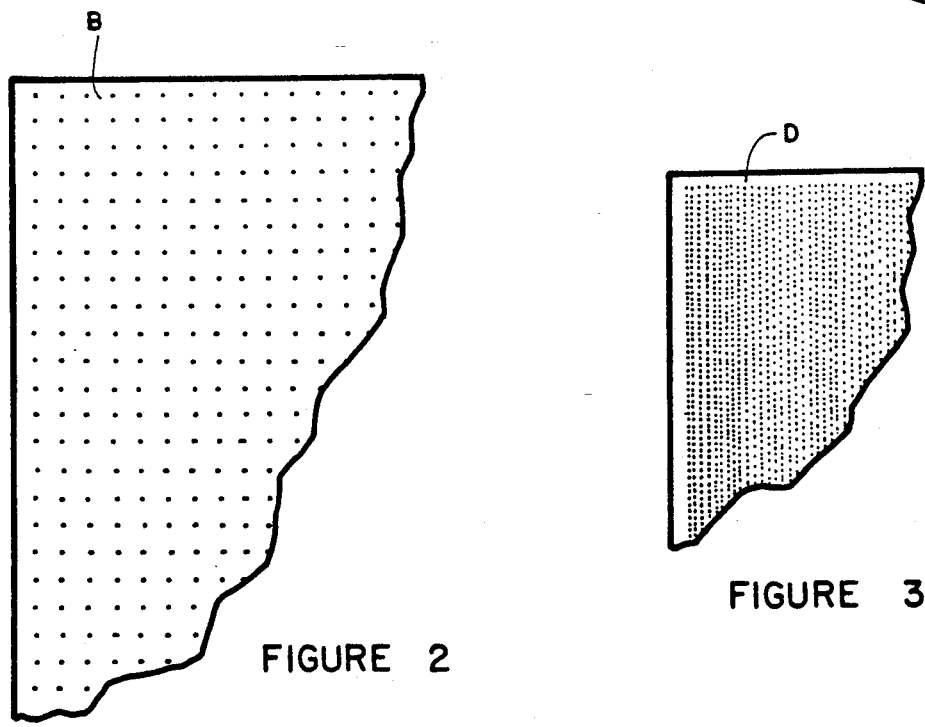
FIGURE 2
FIGURE 3

FIBER OPTIC DATA/GRAPHIC DISPLAY SCREEN

This application is a continuation-in-part of Ser. No. 07/460,650, filed Jan. 3, 1990, abandoned Dec. 30, 1991.

BACKGROUND OF THE INVENTION

1. Field of Use

The invention is directed to a fiber optic light transmission system and more particularly the use of high intensity light selectively transmitted through a plurality of optic fibers from the light source to a remote location therefrom where the plurality of optic fibers are grouped together in the form of a flat screen.

2. Description of Related Art

Presently information visual displays take the form of video displays, L.E.D. lamps grouped, incandescent lamps, Unex displays and the like. The video displays have a drawback, namely, it is hard to read information displayed thereof in high surrounding ambient light areas such as lighted rooms or the like.

The other technologies above mentioned do not have resolution high enough to present an equal amount of information in the same physical area that cathode ray tubes and other technologies are capable of. Therefore, they cannot compete for the same use in many applications.

There has not been a successful solution to overcoming the above mentioned problems existing in the prior art until the emergence of the present invention.

SUMMARY OF THE INVENTION

The invention is directed to the use of a plurality of optic fibers grouped together at one end to form a vertical planer display surface. The optic fibers can be positioned closely adjacent to form a small screen display or spaced apart any desired distance to form a selectively larger display surface.

The optic fibers extend from the display surface to a liquid crystal light shutter which separately controls light from a high intensity light source into the adjacent end surface of each of the individual optic fibers. The individual light optic fibers are arranged at the same relative location at their shutter and display ends. Digital signals from a computer of the like selectively opens and closes the individual shutters to allow light into each selected optic fiber which travels through the optic fibers to the distal end thereof.

Selected combinations of shutter openings provides for a visual presentation at the display surface of the optic fibers. For example, words and/or pictorial presentations can be formed by the combination of light and dark areas on the display screen.

An object of this invention is to provide a visual presentation screen that can be readily viewed in high ambient light conditions.

Another object of this invention is to provide a visual presentation screen that can be sized up or down to be suitable for the purpose and location intended.

Still another object of this invention is to provide a visual presentation screen that has a high contrast background to enhance the readability of the lighted areas.

Other objects and features of the invention will become apparent as the drawings which follow are understood by reading the corresponding description thereof.

BRIEF DESCRIPTION OF THE DRAWING FIGURES

FIG. 1 is an exploded schematic showing of the various elements of the present invention;

FIG. 2 is a plan schematic view showing of the display screen of FIG. 1;

FIG. 3 is a plan schematic view showing of the light control shutter of the invention;

DETAILED DESCRIPTION OF THE PREFERRED EMBODIMENTS OF THE INVENTION

Figure 5:
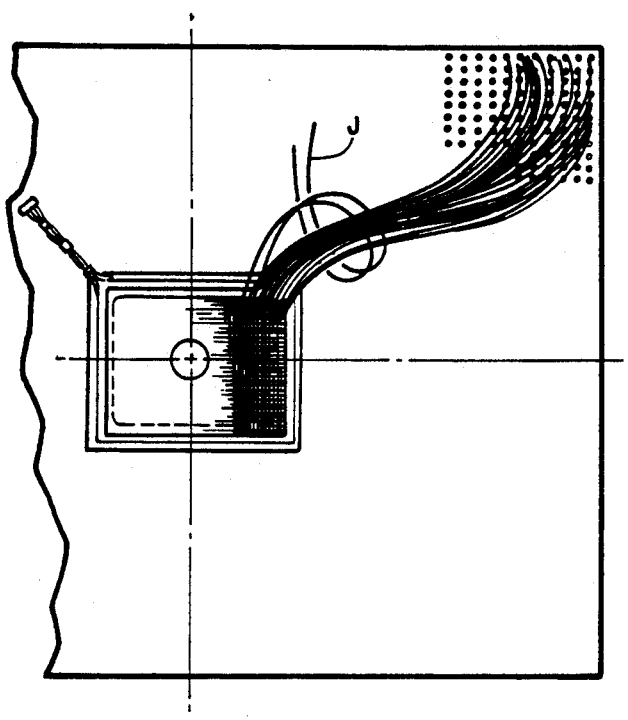
FIG. 5 is a partially cutaway showing of the extension of the optic fibers extending from the light source to the display screen.
Figure 6:
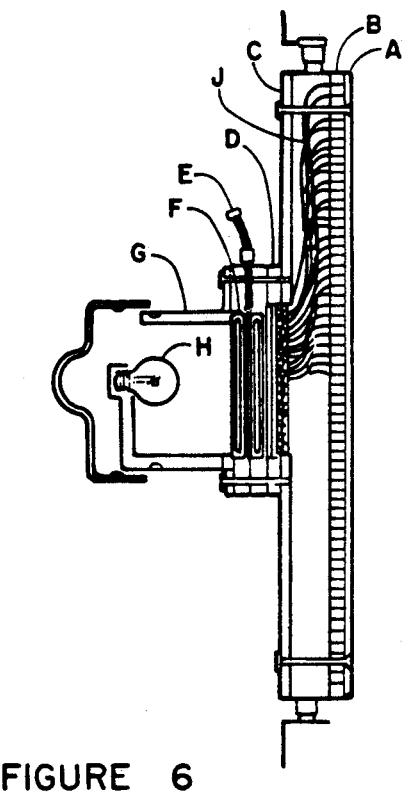
FIG. 6 is a side cutaway view of the components of the device of the invention.
Figure 4:
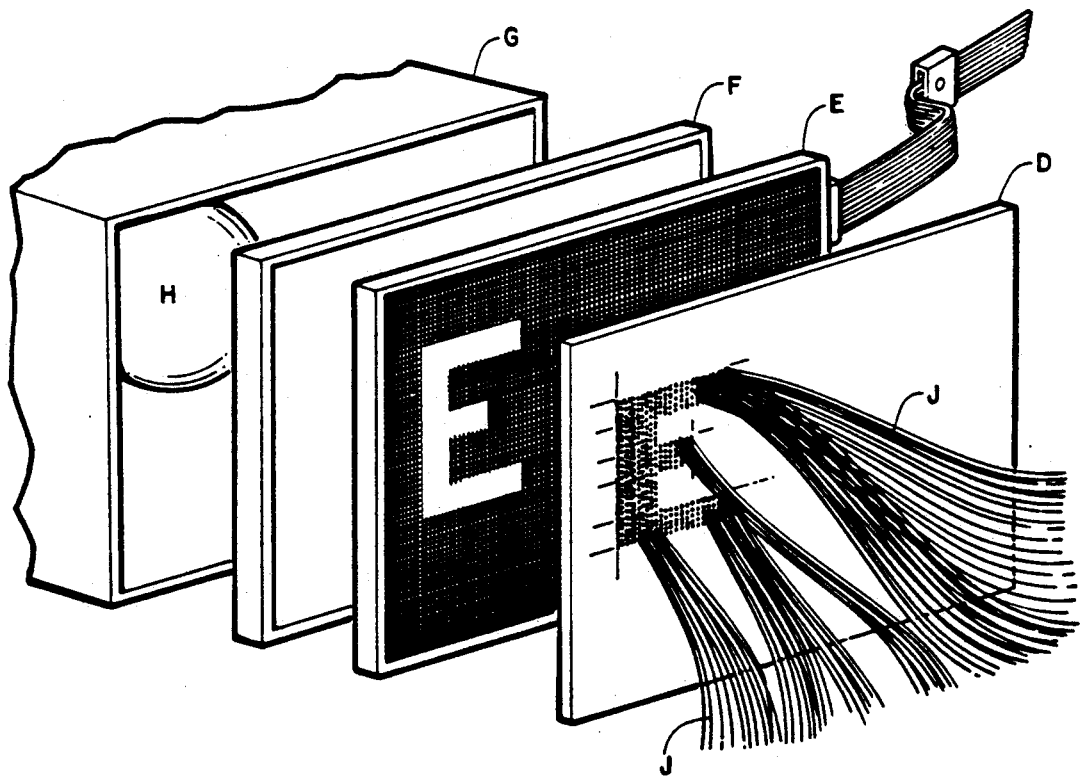
FIG. 4 is a exploded pictorial showing of the fibers extending from the light input of the optic fibers.

Referring now to the various drawing FIGS., FIGS. 1, 4, 5 and 6 show the various components of the visual display device of the present invention.

A source of high intensity light H provides the only light source required for the device of the invention. The light source is housed in a housing G with closed sides and an open front surface for emitting light.

An ultra violet filter is positioned over the front surface of the open front surface of the light source H.

An electronic light shutter E is positioned in front of the ultra violet filter. The electronic shutter comprises a plurality of individual operating light shutters independently operable by digital control from a pre-programmed computer or the like not shown.

An input optic fiber coupler D is positioned adjacent to the electronic light shutter E. As can be readily seen in the drawing FIGS. optic fibers J extend from the input optic fiber coupler to the exit optic fiber coupler B.

Exit fiber coupler B can be of a different physical size that the input optic fiber coupler D. Exit optic fiber coupler B can be sized to accommodate the required size for the purpose intended. FIGS. 2 and 3 denote different sized couplers B and D.

A protective non-reflective cover A covers the distal display ends of the optic fibers.

It should be understood that the source of high intensity light can be from an incandescent source such as filament type light bulb or any other source of light suitable for the purpose intended and can be of a specific color if desired.

OPERATION

To operate the high intensity light H is illuminated, the light control shutter is operated by a computer or the like to open individual light shutters at selected locations. The light from these locations is allowed to pass into the adjacent end of a optic fiber J. The light passing into a particular optic fiber is transmitted to the distal end of that particular optic fiber where the light will be visible to a viewer. A selected combination of selected open shutters will present a selected combined light pattern on the distal ends of these optic fibers. Accordingly, messages can be displayed on the exit fiber coupler which serves as a flat display screen. Any desired words or pictorial display can be made to appear on the surface of the exit coupler B.

Because the spaces on the exit coupler are dark, a great degree of contrast exist between the lighted areas and the non-lighted areas.

The relative position of the optic fibers on the input optic fiber coupler and the exit optic fiber coupler are the same so that programming of the information on the exit optic fiber coupler will be easier than if the relative positions of the optic fibers were random.

Although it is shown that the input optic fiber coupler is relatively closely positioned relative to the exit optic coupler it should be understood that the couplers could be greatly spaced apart if desired to practice this invention.

While a specific embodiment of this invention has been shown and fully explained above for the purpose of illustration it should be understood that many alterations, modifications and substitutions may be made to the instant invention disclosure without departing from the spirit and scope of the invention as defined by the appended claims.

What is claimed is:

1. An improved graphic display device comprising:
    a source of high intensity light;
    a light control panel having a plurality of individually selectively operable shutters for transmitting light directly from said source of high intensity light;
    a plurality of optic fibers a first end of which extend from each of said plurality of individually selectively operable shutters and a second end extending a selected distance from said first end; and
    a flat display coupler for receiving the second end of said plurality of optic fibers and providing a planar termination surface therefore whereby when selected shutters are operated to allow light to enter the first end of selected optic fibers said light is transmitted to the second end of said selected optic fibers.

2. The invention as defined in claim 1 additionally comprising an ultra violet filter positioned between said source of high intensity light and said light control panel.

3. The invention as defined in claim 1 wherein the surface area of said light control panel has at least as large as the surface area of said flat display coupler.

4. The invention as defined in claim 1 wherein the surface area of said light control panel has a smaller surface area then said flat display coupler.

5. The invention as defined in claim 1 wherein said source of high intensity light is colored.

* * * * *